United States Patent [19]

Itokazu

[11] Patent Number: 5,007,777
[45] Date of Patent: Apr. 16, 1991

[54] HOLE SAW

[76] Inventor: Noboru Itokazu, 5-33-808, Nankonaka 5-chome,, Suminoe-ku, Osaka-shi, Osaka 559, Japan

[21] Appl. No.: 251,221

[22] PCT Filed: Dec. 18, 1987

[86] PCT No.: PCT/JP87/00992
§ 371 Date: Aug. 18, 1988
§ 102(e) Date: Aug. 18, 1988

[87] PCT Pub. No.: WO88/04588
PCT Pub. Date: Jun. 30, 1988

[30] Foreign Application Priority Data

| Dec. 18, 1986 | [JP] | Japan | 61-195381[U] |
| Mar. 25, 1987 | [JP] | Japan | 62-44791[U] |
| Mar. 25, 1987 | [JP] | Japan | 62-44792[U] |
| May 8, 1987 | [JP] | Japan | 60-69089[U] |
| Dec. 23, 1987 | [JP] | Japan | 62-162800[U] |

[51] Int. Cl.$^5$ ............................................. B23B 41/02
[52] U.S. Cl. ..................................... 408/67; 408/206; 408/209
[58] Field of Search ............... 408/203.5, 204, 205, 408/206, 207, 208, 209, 68, 67, 703, 710; 29/DIG. 78; 175/385, 386, 388

[56] References Cited

U.S. PATENT DOCUMENTS

| 1,829,659 | 10/1931 | Kefflo | 408/206 |
| 2,179,029 | 11/1939 | Barnes | 408/206 |
| 2,349,400 | 5/1944 | Beckwith | 408/206 |
| 2,779,361 | 1/1957 | McKiff | 408/224 X |
| 2,794,469 | 6/1957 | Shortell | 408/206 |
| 3,382,743 | 5/1968 | Trevathan | 408/204 X |
| 3,495,359 | 2/1970 | Smith et al. | 408/204 |

FOREIGN PATENT DOCUMENTS

| 2602238 | 8/1977 | Fed. Rep. of Germany | 175/386 |
| 2948682 | 6/1981 | Fed. Rep. of Germany | 408/67 |
| 538824 | 1/1977 | U.S.S.R. | 408/204 |

Primary Examiner—William Briggs

[57] ABSTRACT

A gap for allowing the cutting chips to escape is formed between the hole saw side wall and the workpiece in order to enhance the piercing efficiency. This hole saw comprises a drill part for determining the center of piercing with respect to the workpiece, a tubular part possessing plural piercing knives at the end surrounding the circumference of the drill part, and a shank part for fixing the drill part and the rear part of the tubular part and transmitting the torque from a power unit to the both, whereby at least the piercing knife disposition positions of the tubular part possess portions sequentially different in the distance from the rotary shaft.

23 Claims, 10 Drawing Sheets

HOLE SAW

TECHNICAL FIELD

This invention relates to piercing means, and more particularly to a hole saw for drilling a hole in a material.

BACKGROUND ART

A hole saw is generally composed of a tubular body having a cutting knife provided at its brim, and a guide drill extending from inside the tubular body to the end part, and by rotating the both together, a hole nearly equal to the outside diameter of the tubular body is drilled in the workpiece while being guided by the guide drill. At this time, as a matter of course, the hole drilled in the workpiece is circular. Therefore, when drilling a circular hole, it was widely believed among the manufacturers in the field of this art that the shape of the tubular body of the hole saw should be preferably circular.

However, when drilling a circular hole by a tubular body of cylindrical shape, the gap between the drilled hole and the tubular body is extremely slight. Therefore, cutting chips pose a serious problem. For example, if the workpiece is a soft iron and when its thickness is over 10 mm, or in the case of ALC plate which generates many cutting chips, the problem becomes manifest.

To solve this chip problem, generally, it is known to form a spiral groove for removing cutting chips on the outer circumference of the tubular body. This groove is, however, generally formed by cutting, which complicates the manufacturing process of hole saw. To discharge chips, the required depth of groove is about 1.0 to 1.5 mm or more, and to form such groove, it is necessary to form the tubular body in a thickness of about 3.0 mm. Therefore, complication of manufacturing process and increase of wall thickness cause to increase the product cost.

DISCLOSURE OF INVENTION

A hole saw according to this invention comprises a drill part for determining the center of piercing with respect to the workpiece, a tubular part possessing plural piercing knives at the end surrounding the circumference of the drill part, and a shank part for fixing the drill part and the rear part of the tubular part and transmitting the torque from a power unit to the both, whereby at least the piercing knife disposition positions of the tubular part possess portions sequentially different in the distance from the rotary shaft.

In such structure, a space for allowing the cutting chips to escape is provided, and smooth piercing is realized.

BEST MODE FOR CARRYING OUT THE INVENTION

Figure 1:
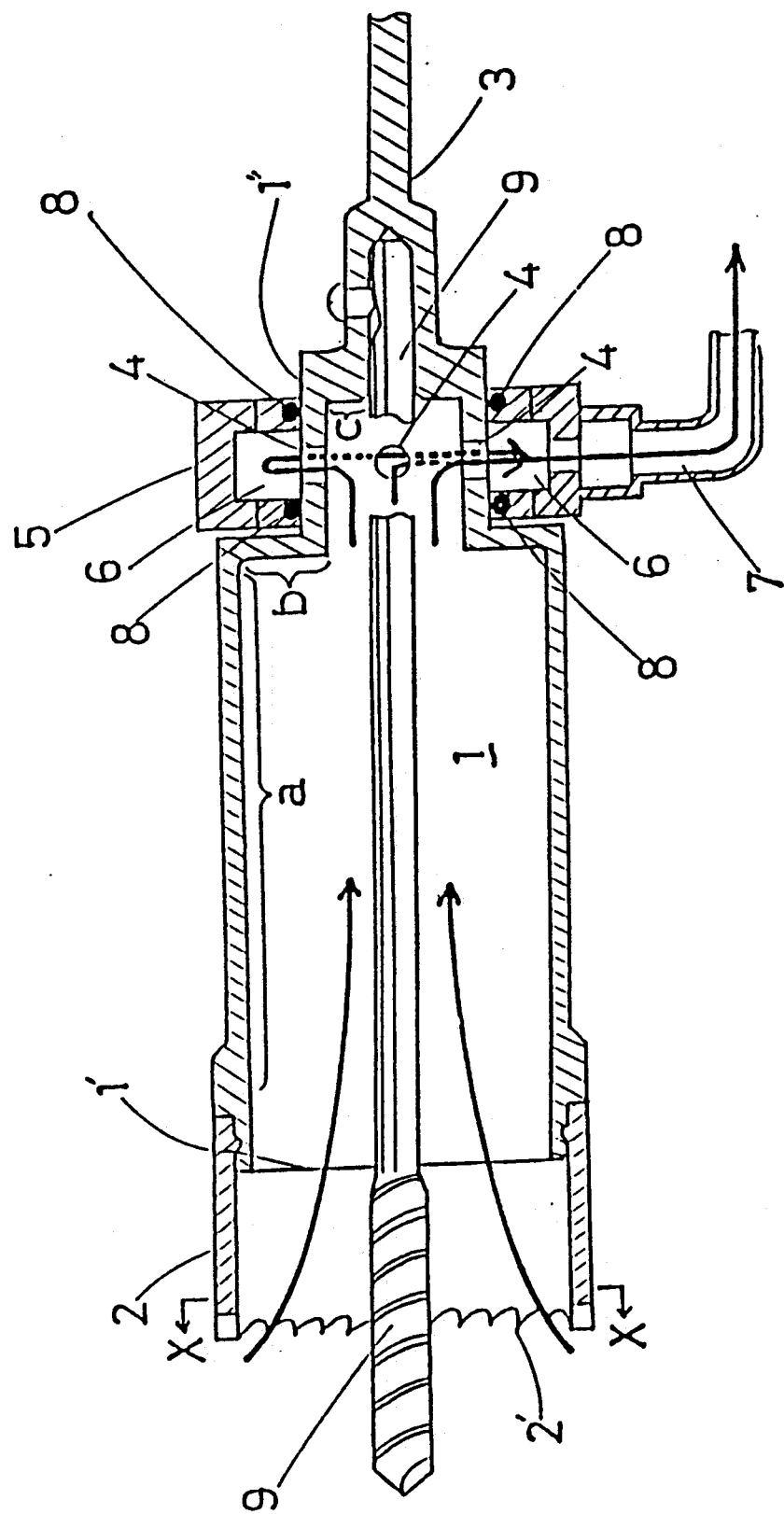
FIG. 1 shows a partially cut-away sectional view of one of the embodiments of this invention.

Referring now to the drawings, some of the preferred embodiments are illustratively described below. In the following embodiments, however, the dimensions, materials, configuration and other conditions of the constituent parts mentioned herein are not intended to limit the scope of the invention unless specifically described, and are mere explanatory examples.

One embodiment of this invention is shown in FIG. 1.

A piercing knife (2) is provided at the end (1') of a tubular main body (1), and its basal part (1'') is communicated with a shank (3). Around this basal part (1''), a hole communicating from inside to outside the main body is disposed at a proper position.

In a manner to cover the hole (4) from outside, a casing (5) is provided around the surface of the basal part (1''). The casing (5) has a hollow part (6) which is opened to the side opposite to the basal part (1''). The casing (5) also has a tube (7) to communicate with an external vacuum pump (not shown). At the abutting position of the casing (5) and basal parat (1''), a bearing is installed to keep airtight in the hollow part (6) of the casing (5). Furthermore, by this bearing (8), the tubular main body can rotate relatively to the casing (5). Numeral (9) is a guide drill for determining the position of piercing.

In this constitution, when the main body (1) is rotated by the torque the shank (3) receives from the motor (not shown), the casing (5) stops at the original position.

By the suction by the external vacuum pump, the cutting chips in the tubular main body (1) pass through the hole (4) to enter the hollow part (6), and are discharged to outside through the tube (7).

The position of the hole (4) is not limited to the point indicated in the drawing, but it may be, for example, provided at positions (a), (b), (c), etc. in FIG. 1, and the casing (5) may be provided depending on its position.

The piercing knife (2) is designed to be joined with the tubular main body (1), and it is shown to be detachable, but it is not intended to be limitative, and it may be integrally formed with the tubular main body (1). This structure is to be described in details below. The knife tip (2') is not limited to the displayed one, and it may be also composed by fitting in the tip.

Figure 2:
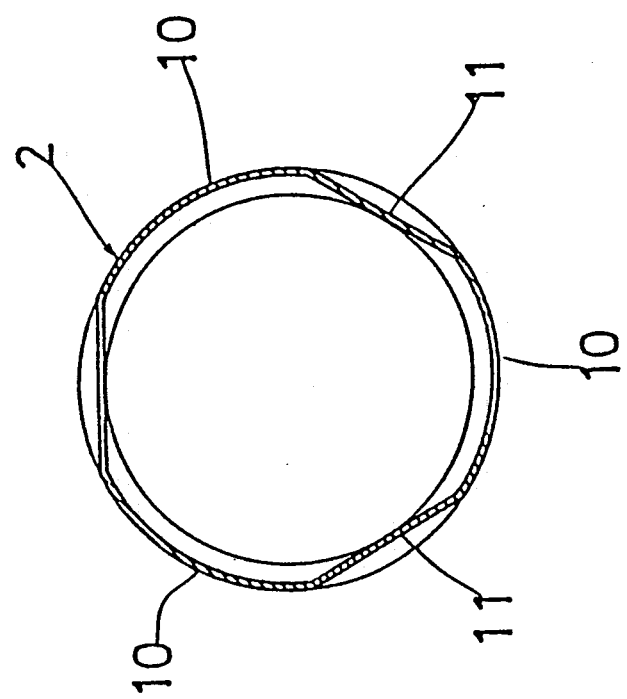

First of all, an embodiment of disposing position of the piercing knife (2) is described. The piercing knife (2) may be composed of, as shown in FIG. 2 (an X—X line end section in FIG. 1), a cylindrical part (10) and a flat retreat part (11). In particular, the cylindrical part (10) and retreat part (11) are disposed at three positions respectively in the illustrated example, but they may be provided at more than or less than three positions, and similar effects are expected. It is for the purpose of keeping a space for allowing the cutting chips going to out side of the piercing knife (2) to escape that the retreat part (11) is provided. Therefore, the retreat part (11) may be disposed at one position, two positions, four positions, five positions, six positions or more.

Figure 3:
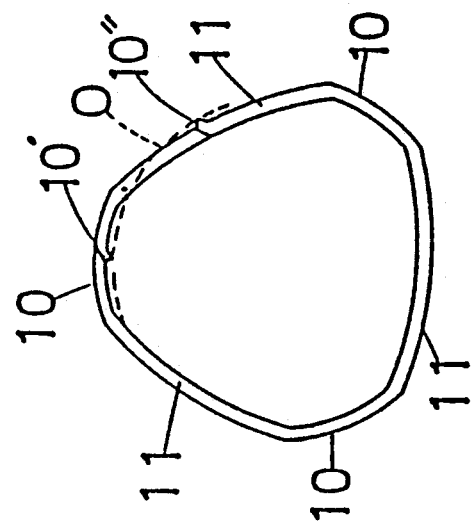
FIG. 2 to FIG. 16 are schematic end sectional views of other embodiments showing the vicinity of piercing knife 2.
Figure 5:
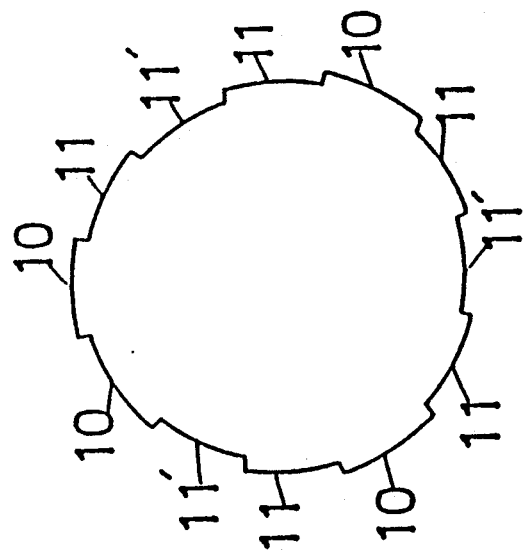
Figure 4:
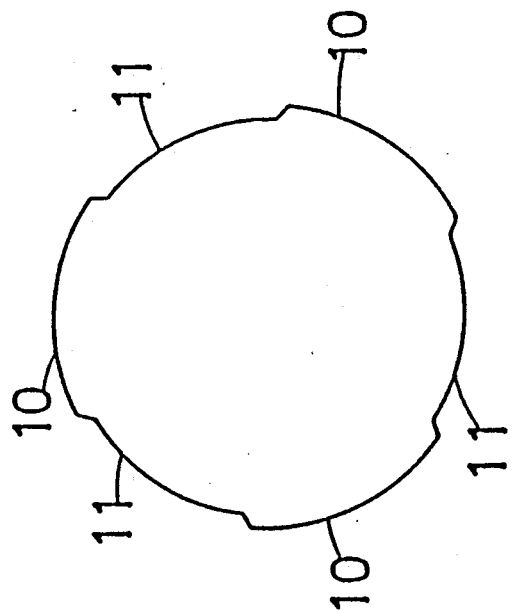
Figure 6:
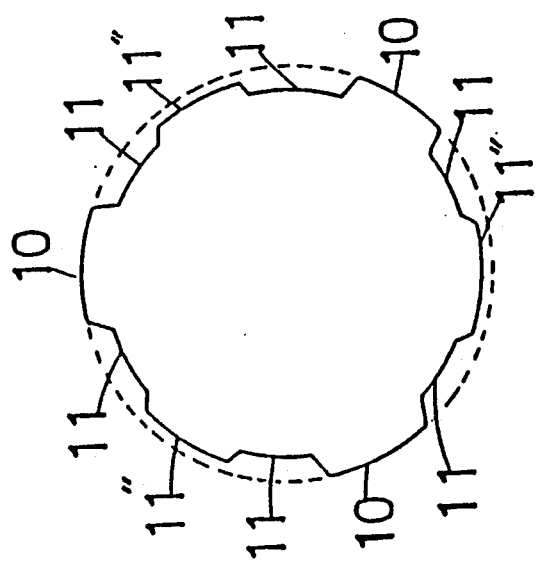

Incidentally, at least the vicinity of the knife tip (2') of the piercing knife (2) may retreat with a curvature as shown in FIG. 3, for example. Furthermore, as shown in FIG. 4, FIG. 5 or FIG. 6, instead of retreating with a curvature, it may be also possible to compose the retreat part by composing the diameter of the piercing knife (2) itself so as to combine circumferences of plural concentric circles differing in diameter. In further details, what is shown in FIG. 4 shows that the retreat part (11) is composed of a circumference of a specified diameter. What is shown in FIG. 5 has the portions further behind the retreat part (11) (the number of portions is not limited to the illustrated example), that is, the post-retreats (11'). What is shown in FIG. 6 has a bulging part larger than others in diameter within the retreat part (11"). A further preferable embodiment is described below while referring to FIG. 3. The knife tip (10") disposed at the cylindrical part (10) is positioned so as to trace the track (that is, circle (o)) or its vicinity drawn by the rotation of the knife tip (10") disposed at the minimum diameter portion of the retreat part (11). This is intended to cover the portion having the smallest number of knifes corresponding to the specific position of the workpiece, and the load of the cutting knife tip at that position is lessened. Such consideration is particularly important if the workpiece is a metal. For cutting of an ordinary soft iron, a play of about 2 mm is generally required, and it is desired that the knife tip be located on the circle having this width. For example, in details, for piercing a soft iron, it was general to have a play of about 2 mm. If the radius of the cylindrical part (10) is about 2 to 3 cm, the number of cutting knives is about 30. In FIG. 3, other knives are omitted.

Figure 7:
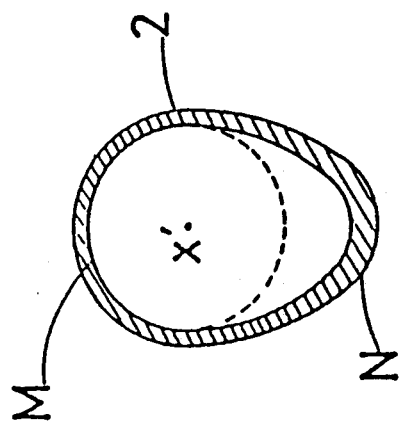

Furthermore, as shown in FIG. 7, the vicinity of the tip of piercing knife (2) may be composed of round part (M) and ellipsoidal part (N).

Figure 8:
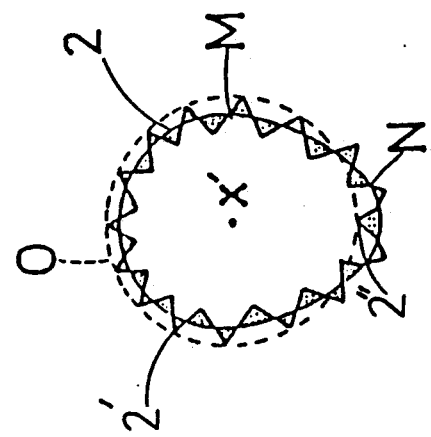

A preferred configuration of piercing knives at this time is shown in FIG. 8. This is a schematic drawing showing the position of the tip (2'). If the ellipsoidal part (N) is larger in diameter when rotating than the other round part (M), the knife tip (2") positioned at the maximum diameter portion is arranged so as to trace the track drawn by the outermost diameter of the knife tip (2') disposed in the round part (M) ( that is, circle (o) ). This is because the largest diameter portion of the piercing knife (2) receives the largest moment by rotation, and it is intended to lessen it to keep the balance of the load applied to the knives. In further details, by tracing the knife tip (2') positioned at the largest diameter portion, the number of cutting rotations of that position is increased, and the stress of the knife tip (2") is lessened. Such knife tip composition is not limited to the one shown in this drawing, but it is effective also in the hole saw described below. (That is, it is intended to compose so that the rotary tracks by the knife tips placed at the largest diameter portion and the smallest diameter portion may be matched as far as possible.)

Figure 9:
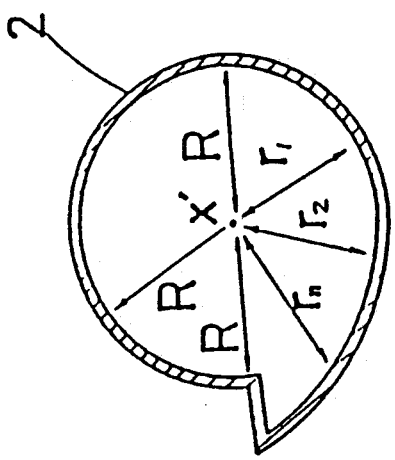

As stated above, such consideration is particularly important when the workpiece is metal. Usually for cutting soft iron, a play of about 2 mm is generally required, and it is desired to dispose the knife tips on the circle having this width. For example, in details, when piercing a soft iron, the play is generally about 2 mm, and the number of knife tips, if the radius of the piercing knife (2) is about 2 or 3 cm, is around 30. (FIG. 8 is intended to explain the position of the knife, not the number of knives.) Other embodiment is shown in FIG. 9. In this example, part of the periphery of piercing knives (2) is round ((R) being constant), and the structure is made up by combining the curves differing in the distance from the center progressively, such as other bobbin curves (that is, the radius from the center (x') is individdually in the relation of (r1) (r2) . . . (rn)). As shown in the illustration, the number of circle and the curve differing in the distance from the center is not limited to one each, but the number may be properly increased to make up a desired composition.

Figure 10:
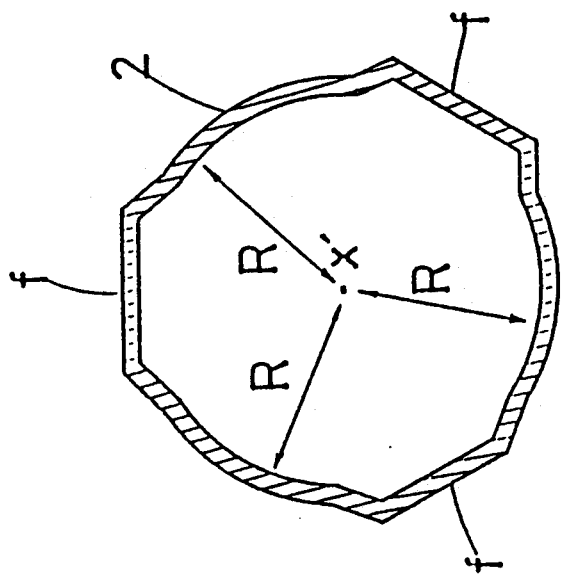

FIG. 10 shows a different embodiment in a sectional view of the piercing knife (2). This is a combination of the circle and straight line on the section of the piercing knife (2). In further details, a portion is bulging outward from the reference circle part ((R) being constant), and a linear portion (f) is disposed at a proper position of this bulging part. The number of bulging parts (linear parts (f)) is not limited to the illustrated example, but a proper number may be employed.

The piercing knife (2) in each drawing is not limited to the structure shown in FIG. 1. For example, only the end part or the vicinity of the piercing knife (2) may be deformed, and the structure may be formed as shown in each drawing, or it may be formed together with the main body (1) into one-body structure, which is described in details later.

Figure 11:
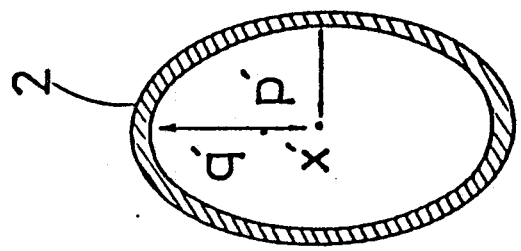
Figure 13:
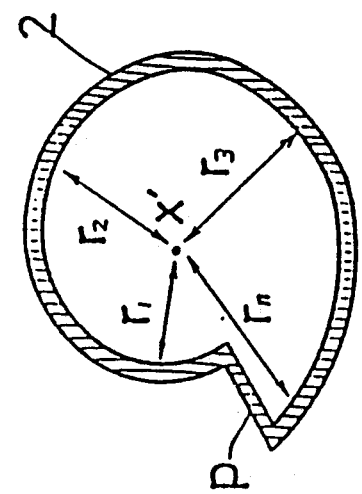
Figure 12:
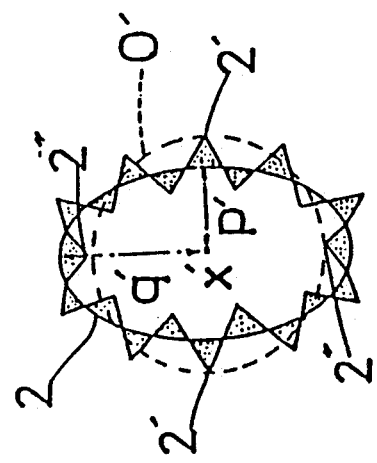

Other embodiment is shown in FIG. 11. The distance from teh rotary shaft (x') to the outer periphery of the piercing knife (2), that is, the diameter composes an ellipse, having the smallest part (the minor axis (p')) and largest part (the major axis (q')), and the length varies progressively. Its preferable embodiment is shown in FIG. 12. This is a schematic drawing showing a referred example of configuration of the piercing knives (2). It is composed so that the knife tip (2") (1") disposed near the largest part (the major axis (q') of the ellipse in this case) may be positioned on or near the track (that is, the circle (o')) drawn by the rotation of the knife tip (2')(2') disposed near the smallest part (the minor axis (p') of the ellipse). This is because the largest part of the diameter of the piercing knife (2) is subjected to the greatest moment by rotation, and it is intended to lessen it to keep balance of the load applied to the cutting knives. In details, by causing the rotary track of the knife tip (2") positioned at the largest diameter part to trace the knife tip (2') positioned at the smallest diameter part, the number of cutting times at that position is increased, and the stress of the knife tip (2") is lessened. Such configuration of the cutting knives is effective not only in the ellipsoidal structure of the piercing knife (2) as shown in FIG. 11, but also in the hole saw shown in FIG. 14, FIG. 15, and FIG. 16 (that is, it is composed so that the rotary tracks of the knife tips disposed at the largest diameter part and the smallest diameter part may be matched as much as possible). Another embodiment is shown in FIG. 13. In this example, a step (p) is formed at one position in the piercing knife (2) by forming the largest part and smallest part in the distance from the rotary shaft (x'), and the other part of the piercing knife (2) gradually changes in the radius (r) from the rotary shaft (x') in one direction (that is, it is composed to keep the relation of (r1)<(r2)<. . . (rn) in the drawing). This step (p) may not be limited to one position, but may be formed in two or more positions, and the object of this application may be satisfied as far as the radius (r) of the circumference of the piercing knife (2) between the steps may vary gradually.

Figure 14:
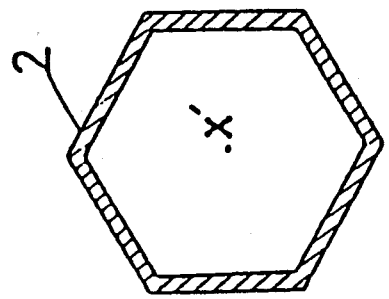

A further different embodiment is shown in FIG. 14 in a sectional view of piercing knife (2).

In this example, the section of the piercing knife (2) is formed polygonally. This is not intended to limit to a regular polygon (but it means to include compound structure, and the number of sides is not limited). The piercing knife (2) is formed in a circular section as in the conventional structure, and the center of the circle is eccentric from the extension of the shank (3), which brings about the same effects.

Figure 15:
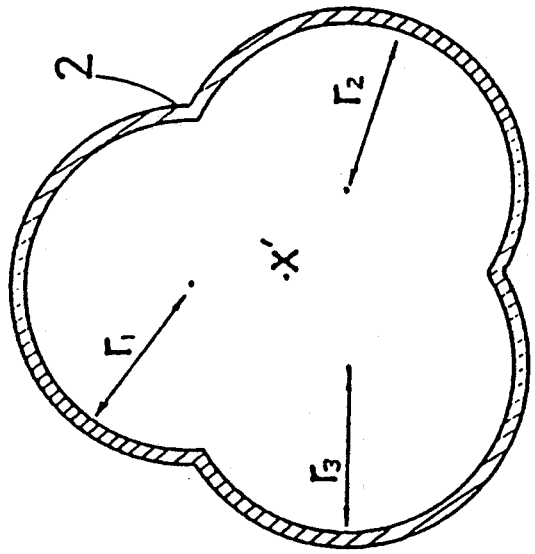

Another different embodiment is shown in FIG. 15 in a sectional view of piercing knife (2).

This is formed by combining with a circle of which center is not on the rotary shaft (x'). Several circles may be combined, or the radii of circles ((r1), (r2), (r3)) may be necessarily identical (or, of course, may be identical, (r1)=(r2)=(r3)).

Figure 16:
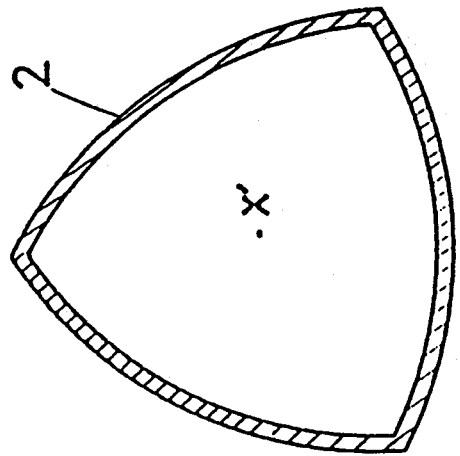

In this case, the shape shown in FIG. 16 may be also included. Furthermore, in FIG. 15, FIG. 16, instead of circles, ellipses may be combined. Or circles and ellipses may be combined, relating to FIG. 13, FIG. 14.

Meanwhile, the piercing knife (2) may be formed in an ordinary circular shape in the entire section, and only the vicinity of the knife tip (2') may be deformed according to the illustrated examples in the individual drawings.

The knife tip (2') is not limited to the shown example, but the tip may be buried or mounted.

The drawings are extremely deformed so that the diameter changes of the piercing knife (2) may be understood easily, and in execution of such embodiments, the rate of change should be set lower. For piercing of ALC, etc., meanwhile, it is possible to execute sufficiently in the state shown in the drawings. In the shown embodiments, the direction of rotation (clockwise, counterclockwise) is not limited, but is arbitrary.

In addition to the materials mentioned above, the hole saw of this application is expected to have sufficient effects in piercing of wood, concrete, asphalt, iron, aluminum, stainless steel, other metal and other ALC, and the material of the workpiece is not limited.

The relation between the piercing knife (2) and the tubular main body (1) is described in details below.

Figure 17:
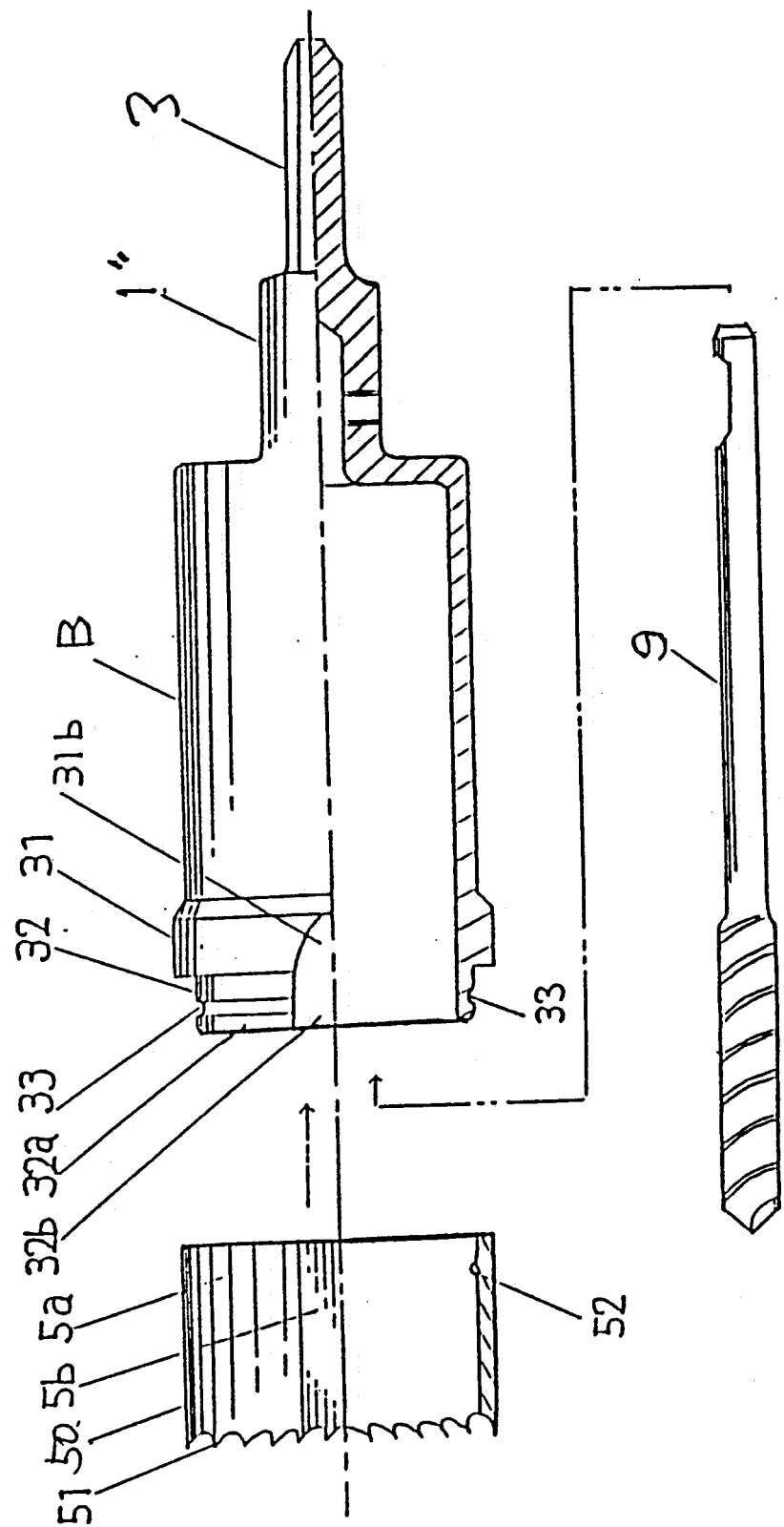
FIG. 17 is a front exploded view showing a different embodiment of this invention.

Referring first to an embodiment in which the piercing knife (2) can be separated and selected from the tubular main body (1), as shown in FIG. 17, an end tubular body (50) is composed of an arc portion (4a) and a retreat portion (5b) on a section orthogonal to its axial direction (the state of mounting the end tubular body (50) on the end insertion part (32) of the body part (B) is shown in FIG. 1). The arc portion (5a) has a peripheral ratio nearly same as that of the intended hole diameter. The retreat portion (5b) is nearly linear withdrawing in the radial direction as compared with the arc portion (5a). This is only intended to show that the end tubular body (50) is formed detachably on the main body (10), and it is not to define the shape of the end tubular body (50).

This end tubular body (50) if affixed to the end of the body part (B). At the end of the body part (B), flange part (31) and insertion part (32) are formed, and the end tubular body (50) is inserted in the insertion part (32) at its basal part, and abuts against the flange part (31). The insertion part (31) has an outer circumferential shape corresponding to the inner circumferential shape of the end tubular body (50).

Furthermore, as shown in FIG. 17, a detent groove (33) extending in the peripheral direction is formed in the arc portion (32a) of the insertion part (32), while a projection (32) is formed on the inner wall of the arc portion (5a) of the end tubular body (50). By fitting the projection (32) into the detent groove (33), slip-out of the end tubular body (50) is prevented. However, if the fitting of the end tubular body (5) and the insertion part (32) is perfect, such stopping means is not necessarily needed, or it may be changed to other stopping means.

The flange part (31) possesses an outside diameter nearly equal to that of the end tubular part (5). The portion continuous to the retreat portion (32b) of the insertion part (32) has a slope (31b) obliquely cut so as to be continuous smoothly. This slope (31b) is not absolutely necessary. To the contrary, the outer circumferential shape of the flange part (31) may be made identical with that of the end tubular body (50).

The outside diameter of the body part (B) is set smaller than the outside diameter of the flange part (31) so as to keep a space for receiving cutting chips against the inner wall of the hole, but the both (B) and (31) may be designed in the same diameter.

The sectional shape of the body is free, and instead of a circle, it may be adjusted to the sectional shape of the end tubular body, or it may be polygonal, too.

Thus, in this hole saw, it is possible to pierce while discharging smoothly the cutting chips from the end tubular body, and also to detach the end tubular body from the main body, so that this part only can be replaced.

Figure 19:
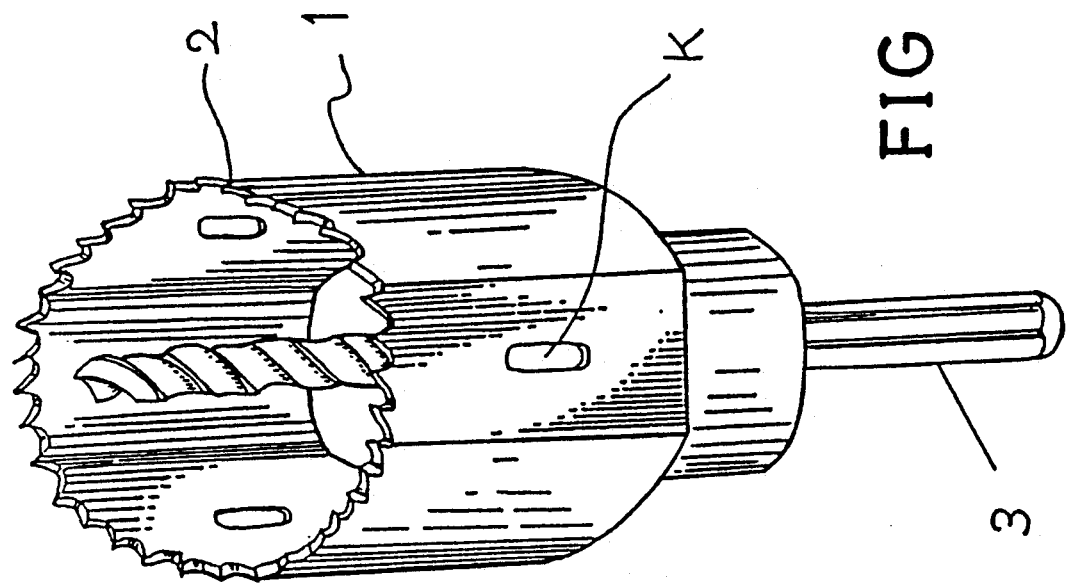
FIG. 19 is a total perspective view showing still another embodiment.

Or, as shown in FIG. 19, the piercing knife (2) and the tubular main body (1) may be composed in one body to make up a hole saw.

Figure 18:
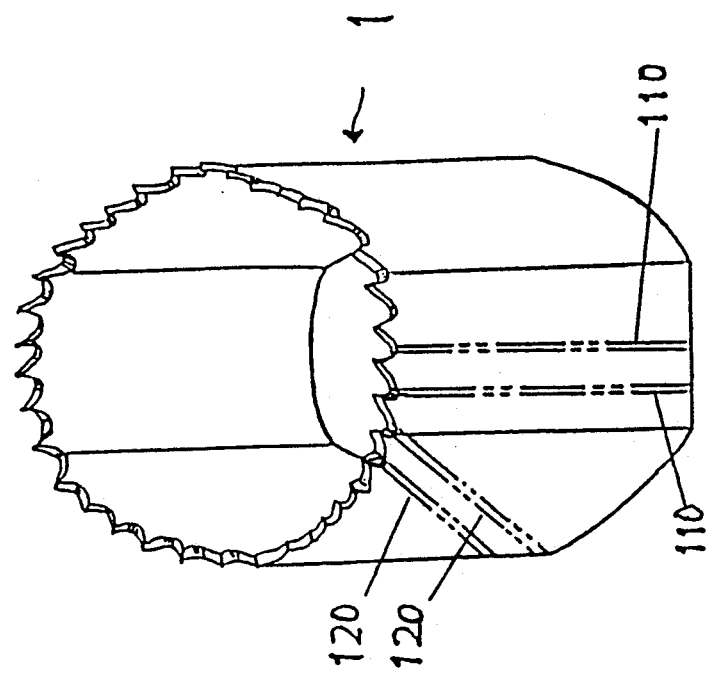
FIG. 18 is an essential part explanatory drawing showing a still different embodiment.

Besides, as shown in FIG. 18, in order to enhance the cutting chip discharge function, a longitudinal groove (110) or spiral groove (120) may be formed on the end tubular body or also on the surface of the main body. Or, though not shown, the rear end of the end tubular body may be in a circular section as in the prior art.

Figure 21:
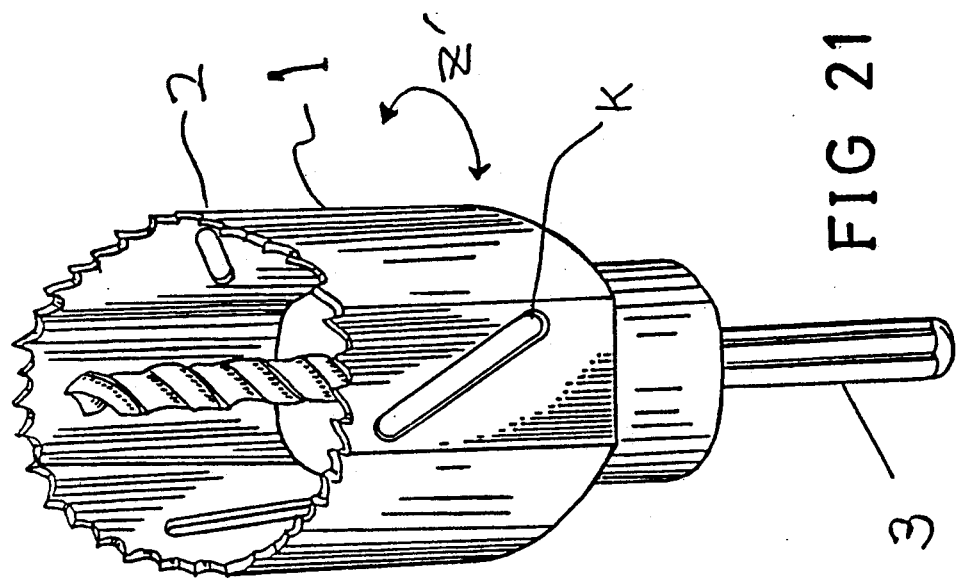
FIG. 21 is a total perspective view showing another different embodiment.
Figure 20:
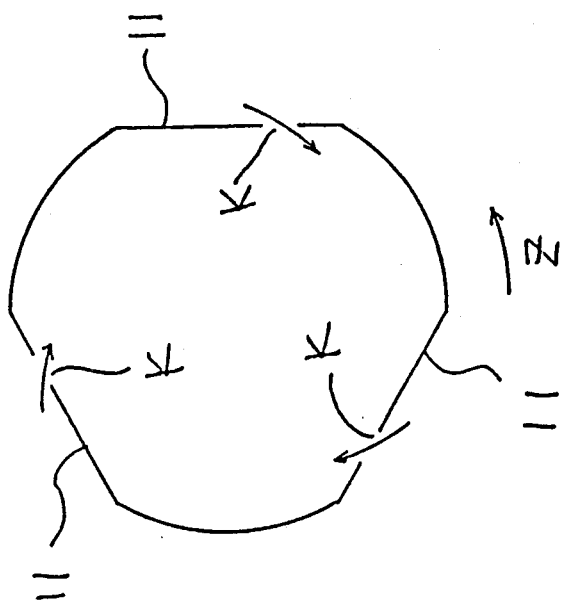
FIG. 20 is an explanatory drawing of other embodiment accessory to the embodiment in FIG. 19.

In FIG. 19, the hole (K) at the side of the main body (1) is provided in order to scrape out the chips collected inside the main body (1) by inserting the tip of a screwdriver or the like. When this hole (K) is formed in the suction type hole saw, for example, as shown in FIG. 1, the cutting chips outside the retreat part (11) may be taken into the main body (11), so that it is effective to discharge. In particular, by disposing at the position shown in FIG. 20, that is, at a position shifted to the rear side in the rotating direction (Z) from the center of the retreat part (11), the taken-in effect of the cutting chips may be improved. Or, as shown in FIG. 21, when a hole (K) is formed obliquely to the rotating direction (Z') of the hole saw, the opening area can be wider, and the effect be greater

INDUSTRIAL APPLICABILITY

Thus, the hole saw of this invention can be applied in piercing of various materials as a rotary cutting tool, and can pierce smoothly.

I claim:
1. A hole saw comprising:
a basal part having a coupling for joining to a rotary power source;
a centering drill operatively mounted along a central axis of said basal part; and
a tubular body having a first end joined to said basal portion and a second end provided with a cutting edge having cutting teeth, said cutting edge comprising a portion thereof having varying cross-sectional contour which locates said cutting teeth at different distances from said central axis, said cutting edge having a plurality of sections having cylindrical cross-sectional contours and a plurality of retreat sections, the retreat sections being provided between the cylindrical sections whereby a contour of said cutting edge alternates between a cylindrical section and a retreat section, the retreat sections having a cylindrical cross-sectional contour generally centered about the central axis, said cylindrical sections also being generally centered about the central axis but having a diameter therefrom which is greater than a diameter from the central axis to the retreat sections, the retreat and cylindrical sections each having a stepped portion therebetween, and each retreat section has a plurality of subsections positioned at varying distances from the central axis and interconnected by stepped portions.

2. A hole saw comprising:
a basal part having a coupling for joining to a rotary power source;
a central drill operatively mounted along a central axis of said basal part; and
a tubular body having a first end joined to said basal portion and a second end mounted to a cutting edge having cutting teeth, a lower end and sidewall portion of the cutting edge surrounds the second end of the tubular body in substantially uninterrupted contact therewith,
said cutting edge comprising a portion thereof having varying cross-sectional contour which locates said cutting teeth at different distances from said central axis, said portion having a plurality of sections having cylindrical cross-sectional contours and a plurality of retreat sections, the retreat sections being provided between the cylindrical sections and step portions being provided between each retreat section and cylindrical section whereby a contour of said cutting edge alternates between a cylindrical section and a retreat section with a step portion therebetween.

3. The hole saw as defined in claim 2, wherein each of the step portions is positioned at an angle greater than 45° with respect to adjacent cylindrical sections and retreat sections.

4. The hole saw as recited in claim 2, wherein the cutting teeth are located only on the cylindrical sections and the retreat sections, the step portions thereby being free of cutting teeth.

5. The hole saw as recited in claim 2, wherein the cylindrical sections and retreat sections both have a curved configuration whereby all of each of the cylindrical sections are positioned substantially the same distance from the central axis and whereby all of each of the retreat sections are positioned substantially the same distance from the central axis.

6. The hole saw as recited in claim 2, wherein the cylindrical sections have a curved configuration whereby all of each of the cylindrical sections are positioned substantially the same distance from the central axis.

7. The hole saw as recited in claim 2, wherein the retreat sections have a curved configuration whereby all of each of the retreat sections are positioned substantially the same distance from the central axis.

8. The hole saw as defined in claim 2, wherein said basal part comprises a bore for receiving and affixing said centering drill and an annular portion surrounding said centering drill with substantial clearance;
said annular portion comprising an opening therethrough providing a discharge path from said clearance to a region outside of said annular portion; and a vacuum manifold surrounding and sealingly engaging said annular portion so as to define therewith an annular chamber for receiving cuttings which collect within said tubular body and are drawn through said opening.

9. The hole saw as defined in claim 8, wherein a plurality of said openings in a circumferentially spaced array are provided through said annular portion.

10. The hole saw as defined in claim 2, wherein each of the retreat sections have a cylindrical cross-sectional contour generally centered about the central axis, said cylindrical sections also being generally centered about the central axis but having a distance therefrom which is greater than a distance from the central axis to the retreat sections, the step portions each having a distance which varies from the central axis.

11. A hole saw comprising:
a basal part having a coupling for joining to a rotary power source;
a centering drill operatively mounted along a central axis of said basal part; and
a tubular body having a first end joined to said basal portion and a second end provided with a cutting edge having cutting teeth, said cutting edge comprising a portion thereof having varying cross-sectional contour which locates said cutting teeth at different distances from said central axis, said cutting edge having a plurality of sections having cylindrical cross-sectional contours and a plurality of retreat sections, the retreat sections being provided between the cylindrical sections and step portions being provided between each of the retreat sections and cylindrical sections whereby a contour of said cutting edge alternates between a cylindrical section and a retreat section with a step portion therebetween, and the cutting teeth being located only on the cylindrical sections and the retreat sections whereby the step portions are free of cutting teeth.

12. The hole saw as defined in claim 11, wherein each of the step portions is positioned at an angle greater than 45° with respect to adjacent cylindrical sections and retreat sections.

13. The hole saw as recited in claim 11, wherein the cylindrical sections and retreat sections both have a curved configuration whereby all of each of the cylindrical sections are positioned substantially the same distance from the central axis and whereby all of each of the retreat sections are positioned substantially the same distance from the central axis.

14. The hole saw as recited in claim 11, wherein the cylindrical sections have a curved configuration whereby all of each of the cylindrical sections are positioned substantially the same distance from the central axis.

15. The hole saw as recited in claim 11, wherein the retreat sections have a curved configuration whereby all of each of the retreat sections are positioned substantially the same distance from the central axis.

16. The hole saw as defined in claim 11, wherein said basal part comprises a bore for receiving and affixing said centering drill and an annular portion surrounding said centering drill with substantial clearance;
said annular portion comprising an opening therethrough providing a discharge path from said clearance to a region outside of said annular portion; and a vacuum manifold surrounding and sealingly engaging said annular portion so as to define therewith an annular chamber for receiving cuttings which collect within said tubular body and are drawn through said opening.

17. The hole saw as defined in claim 16, wherein a plurality of said openings in a circumferentially spaced array are provided through said annular portion.

18. The hole saw as defined in claim 11, wherein each of the retreat sections have a cylindrical cross-sectional contour generally centered about the central axis, said cylindrical sections also being generally centered about the central axis but having a distance therefrom which is greater than a distance from the central axis to the retreat sections, the step portions each having a distance which varies from the central axis.

19. The hole saw as defined in claim 1, wherein a first one of the retreat subsections is connected via a first stepped portion to one of the cylindrical portions, a second one of the retreat subsections is connected via a second stepped portion to the first subsection and a third one of the retreat subsections is connected to the second subsection by a third stepped portion, said third retreat subsection also being connected to another one of the cylindrical portions by a fourth stepped portion whereby three retreat subsections are provided for each retreat section.

20. The hole saw as defined in claim 19, wherein the second retreat subsection of each retreat section is positioned closer to the central axis than the first retreat subsection and the third retreat subsection.

21. The hole saw as defined in claim 19, wherein the second retreat subsection of each retreat section is positioned further from the central axis than the first retreat subsection and the third retreat subsection.

22. The hole saw as defined in claim 1, wherein said basal part comprises a bore for receiving and affixing said centering drill and an annular portion surrounding said centering drill with substantial clearance;

said annular portion comprising an opening therethrough providing a discharge path from said clearance to a region outside of said annular portions; and a vacuum manifold surrounding and sealingly engaging said annular portion so as to define therewith an annular chamber for receiving cuttings which collect within said tubular body and are drawn through said opening.

23. The hole saw as defined in claim 22, wherein a plurality of said openings in a circumferentially spaced array are provided through said annular portion.

* * * * *